Sept. 3, 1968       M. C. THOMPSON, JR., ET AL       3,400,330
REFRACTOMETER THAT MEASURES THE DIFFERENCE IN REFRACTIVE
INDICES OF A GAS AT TWO FREQUENCIES
Filed May 13, 1965
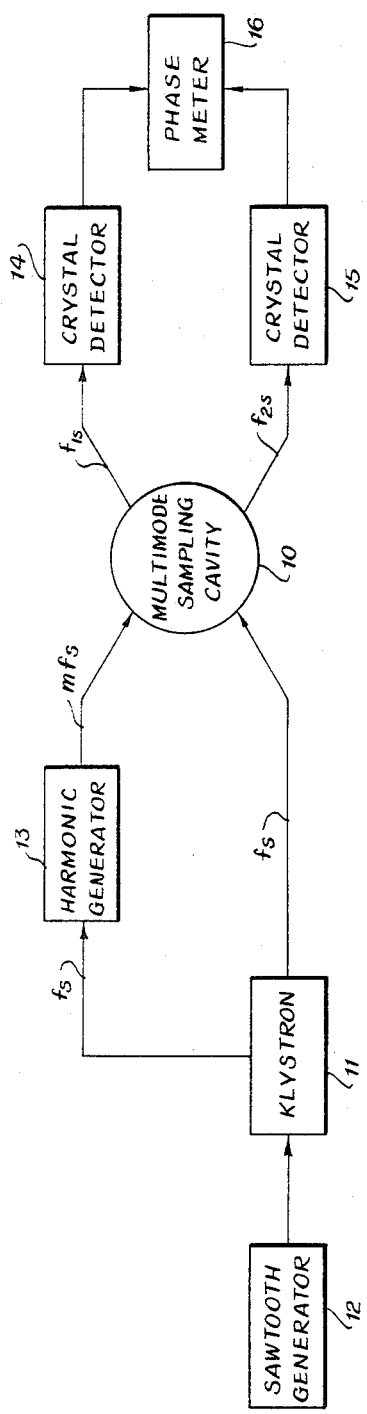
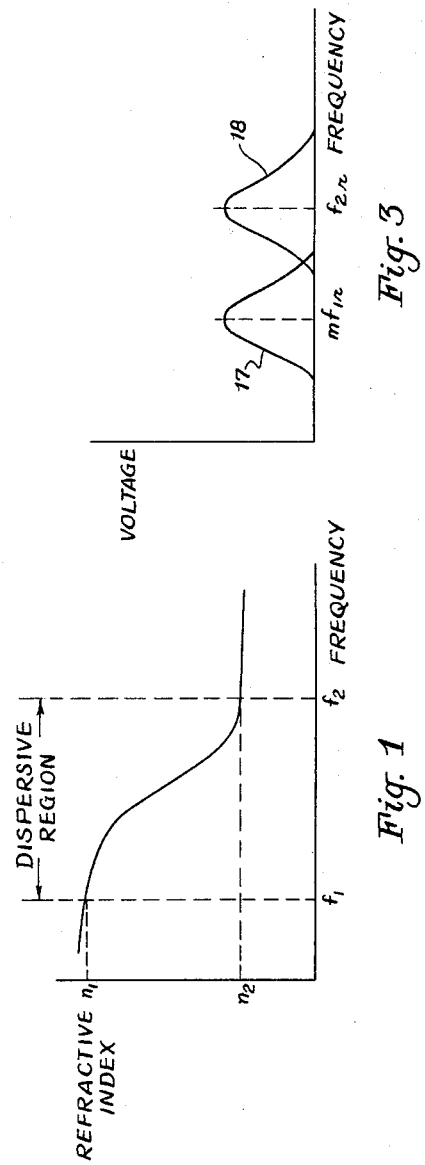
INVENTORS
Moody C. Thompson, Jr.
Maurice J. Vetter
BY David Robbins
ATTORNEY

United States Patent Office

3,400,330
Patented Sept. 3, 1968

3,400,330
REFRACTOMETER THAT MEASURES THE DIFFERENCE IN REFRACTIVE INDICES OF A GAS AT TWO FREQUENCIES
Moody C. Thompson, Jr., and Maurice J. Vetter, Boulder, Colo., assignors to the United States of America as represented by the Secretary of Commerce
Filed May 13, 1965, Ser. No. 455,662
3 Claims. (Cl. 324—58.5)

ABSTRACT OF THE DISCLOSURE

In this differential refractometer a sample of gas is placed in a multimode resonant cavity. The cavity is excited simultaneously in a fundamental and harmonic mode. The difference in phase between the output signals obtained at each of the two modes is measured to determine the difference in refractive indices of the gas at the two frequencies.

---

This invention relates in general to a refractometer and in particular to one that measures the difference between the refractive indices of a gas sample at two frequencies.

It is well known that the velocity of an electromagnetic wave in a medium often depends on its frequency. This phenomena is generally referred to as dispersion of the medium and can be expressed as the rate of change of the index of refraction with the frequency of the wave. One convenient way to define the dispersion quantitatively involves the determination of the difference between the refractive indices for the medium measured at a first and second frequency.

An arrangement in the prior art, employed for this purpose, comprises a precisely calibrated reference cavity and a pair of sampling cavities, each capable of responding in a different frequency band and each containing a sample of the same gas. The reference cavity is used to determine the refractive index of the sample of gas in one cavity at a certain frequency and is then used to determine the refractive index of a second sample of the same gas in the other cavity at the second frequency. The difference between the two refractive indices is the desired measurement.

This arrangement has many disadvantages. First, two samples are required and the conditions of the first, e.g., temperature, pressure and purity, can not be precisely reproduced in the second. Again, the dimensions of each sampling cavity are sensitive to a different degree of ageing, temperature and other random and uncontrollable factors. Further, a different range of instrumentation must be used in measuring the refractive index of each sample. All of these factors introduce small errors that can not be precisely corrected in the calculations, and since the difference in the refractive indices may be very small, the errors may easily obscure the dispersion effects to be measured.

It is therefore an object of the present invention to provide a refractometer in which the difference in the refractive indices of a sample of gas at two different frequencies is determined in one measurement with a single cavity.

This is accomplished by placing a sample of gas, whose dispersive characteristics are to be measured, in a multimode resonant cavity, exciting the cavity simultaneously in a fundamental and a harmonic mode, and then measuring the difference in phase between the output signals obtained at each of the two modes.

In the figures:

FIG. 1 presents a curve of refractive index versus frequency of a gas whose dispersion characteristics are to be measured;

FIG. 2 is an embodiment of the present invention; and

FIG. 3 illustrates the phase relationship between a pair of pulses, each of which appears in the output of a related crystal detector in FIG. 2.

To measure the dispersion in a medium between two frequencies $f_1$ and $f_2$ (such as in an air sample containing water vapor) a single resonant cavity is used which can be simultaneously excited in two harmonically related modes. Let $f_2 = mf_1$ where $m$ is the order of the mode and is large enough that the two frequencies $f_1$ and $f_2$ fall on either side of the dispersion to be measured in the characteristic of the medium shown in FIG. 1. Then the resonant frequency in the region below the dispersion will be $f_{1r} = k/n_1$ where $n_1$ is the refractive index associated with $f_{1r}$ and $k$ is a constant for the given cavity dimensions, while the resonant frequency in the region above the dispersion will be $f_{2r} = mk/n_2$ where $n_2$ is the refractive index associated with $f_{2r}$.

If we compare $f_{2r}$ and $mf_{1r}$, we have $$f_{2r} - mf_{1r} = mk\left(\frac{1}{n_2} - \frac{1}{n_1}\right) = mk\frac{(n_1 - n_2)}{n_1 n_2}$$

For many cases this can be simplified from the condition that $n_1 \approx 1 \approx n_2$ so that we can write $$\frac{f_{2r} - mf_{1r}}{mk} \doteq n_1 - n_2$$

One arrangement for measuring $f_{2r} - mf_{1r}$ is shown in FIG. 2. In this figure, the multimode, resonant sampling cavity 10 is dimensioned to obtain the desired frequency $f_1$ in the lowest or fundamental mode. An harmonic mode of the cavity is then selected that is easily excited and detected to provide frequency $f_2$ with the least interference with the fundamental mode. If, for example, a cylindrical cavity is used, the $TE_{011}$ and $TE_{234}$ modes may be utilized as the fundamental and harmonic modes, respectively. The input and output irises of the cavity are positioned to provide minimum coupling between the two modes.

The klystron 11 is frequency modulated by a linear sweep voltage provided by sawtooth, sweep generator 12. The output frequency $f_s$ of the klystron extends over a range that includes $f_{1r}$ and $f_{2r}/m$ and is applied to one input iris of cavity 10 to excite the fundamental mode. At the same time frequency $f_s$ drives the harmonic generator 13 to develop frequency $mf_s$ which is applied to the other input iris of cavity 10 to excite the harmonic mode. Frequencies $f_{1s}$ and $f_{2s}$, appearing in the output irises of the cavity, are applied to crystal detectors 14 and 15, respectively.

In a typical operation, a sample of gas is placed in resonant cavity 10. As sawtooth generator 12 sweeps through a cycle, if there is no dispersion the two modes of the cavity are harmonically related and their resonance peaks occur nominally simultaneously. In this case $f_{2r} = mf_{1r}$ and the pulse trains generated by crystal detectors 14 and 15 are in phase. If dispersion occurs, the two modes do not resonate at the same time in the sweep cycle, $f_{2r} > mf_{1r}$ and there is a phase shift between the two pulse trains obtained from detectors 14 and 15, as illustrated in FIG. 3 by the pair of pulses 17 and 18 derived from 14 and 15, respectively. If the sweep of generator 12 is linear this phase difference is directly proportional to the dispersion and the output of phase meter 16 provides the desired measurement.

What is claimed is:
1. A differential refractometer comprising:
   a cavity capable of resonating in a fundamental mode and in a mode that is a harmonic of said fundamental mode,
   first and second input means for coupling electromagnetic energy into the fundamental and harmonic mode, respectively, first and second output means for coupling electromagnetic energy out of said fundamental and harmonic mode, respectively, means for generating a fundamental frequency and a frequency that is a harmonic of the fundamental frequency, the fundamental frequency being capable of exciting said cavity in the fundamental mode and the harmonic frequency being capable of exciting said cavity in the harmonic mode, means for applying the fundamental and harmonic frequencies to said first and second input means, respectively, and means for measuring the difference in phase between the signal appearing in said first output means and the signal appearing in said second output means.

2. The refractometer set forth in claim 1 wherein the frequency generating means comprises:

a sweep generator, a klystron connected to the output of said sweep generator, and an harmonic generator connected to the output of said klystron, whereby the output of said klystron includes said fundamental frequency and the output of said harmonic generator includes said harmonic frequency.

3. The refractometer set forth in claim 1 wherein the phase measuring means comprises:

a first and second detector connected to said first and second output means, respectively, and a phase meter connected to the outputs of said first and second detector.

References Cited

UNITED STATES PATENTS

| 2,580,968 | 1/1952 | Sproull | 324—58.5 X |
| 2,792,548 | 5/1957 | Hershberger | 324—58.5 |
| 2,964,703 | 12/1960 | Sargent et al. | 324—58.5 |
| 3,323,049 | 5/1967 | Hanken | 324—61 |

RUDOLPH V. ROLINEC, *Primary Examiner.*

P. F. WILLE, *Assistant Examiner.*